US008561877B2

(12) United States Patent
Carlson et al.

(10) Patent No.: US 8,561,877 B2
(45) Date of Patent: Oct. 22, 2013

(54) STRUCTURAL INTEGRITY WELDED ASSEMBLY

(75) Inventors: Blair E. Carlson, Ann Arbor, MI (US); Mark Allan Cunningham, Romeo, MI (US); Robert T. Szymanski, St. Clair Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 89 days.

(21) Appl. No.: 13/282,534

(22) Filed: Oct. 27, 2011

(65) Prior Publication Data

US 2013/0106123 A1 May 2, 2013

(51) Int. Cl.
B23K 20/12 (2006.01)

(52) U.S. Cl.
USPC ........................................ 228/112.1; 228/135

(58) Field of Classification Search
None
See application file for complete search history.

(56) References Cited

U.S. PATENT DOCUMENTS

| 1,857,526 A * | 5/1932 | Burnish ................ 219/137 R |
| RE43,846 E * | 12/2012 | Sano et al. .............. 228/112.1 |
| 2001/0004992 A1* | 6/2001 | Kawasaki et al. ......... 228/112.1 |
| 2003/0075584 A1* | 4/2003 | Sarik et al. ................. 228/2.1 |
| 2004/0065716 A1* | 4/2004 | Young et al. ............. 228/112.1 |
| 2004/0069834 A1* | 4/2004 | Aota et al. ............... 228/112.1 |
| 2004/0155094 A1* | 8/2004 | Okamoto et al. ......... 228/112.1 |
| 2005/0247756 A1* | 11/2005 | Frazer et al. ................ 228/101 |
| 2007/0163120 A1* | 7/2007 | Okamoto et al. ........ 29/890.054 |
| 2010/0101768 A1* | 4/2010 | Seo et al. ..................... 165/168 |
| 2010/0252171 A1* | 10/2010 | Feng et al. .................. 156/73.5 |
| 2010/0275834 A1* | 11/2010 | Takaoka et al. ............. 114/74 R |
| 2011/0068619 A1* | 3/2011 | Werner et al. ................ 301/127 |
| 2013/0001964 A1* | 1/2013 | Freundl et al. ............... 293/133 |

FOREIGN PATENT DOCUMENTS

| EP | 2236841 A | * | 10/2010 |
| JP | 11-028581 A | * | 2/1999 |
| JP | 2000-301992 A | * | 10/2000 |
| JP | 2001-246482 A | * | 9/2001 |
| JP | 2006-144866 A | * | 6/2004 |

OTHER PUBLICATIONS

Derwent-Acc-No. 2010-A81349 which corresponds to KR-2009-113934A (2010).*

* cited by examiner

Primary Examiner — Kiley Stoner
(74) Attorney, Agent, or Firm — Quinn Law Group, PLLC

(57) ABSTRACT

A welded assembly characterized by improved structural integrity includes a first component disposed along a first plane. The first component includes first and second substantially parallel surfaces, and also includes a channel arranged on the first surface. The welded assembly also includes a second component disposed along a second plane, wherein the second component includes a leading edge. The leading edge of the second component is inserted into the channel of the first component such that an interface is formed between the first and second components. A weld generated on the second surface joins the first component with the second component at the interface such that the assembly is formed. The subject weld may be a friction-stir type of a weld. The subject welded assembly may be a vehicle bumper support. A method of forming such a welded assembly is also disclosed.

6 Claims, 3 Drawing Sheets

STRUCTURAL INTEGRITY WELDED ASSEMBLY

TECHNICAL FIELD

The invention relates to a welded assembly having improved structural integrity.

BACKGROUND

Welding is a fabrication or process that joins materials, usually metals or thermoplastics, by causing coalescence. This is often done by melting the substrates of the work-piece and adding a filler material to form a pool of molten material, a.k.a., the weld pool, at the substrate interface. After the weld pool at the substrate interface cools, a high strength joint is produced.

Depending on the type and quality of the materials sought to be joined, the same welding process may expend/consume vastly different amounts of energy to generate a robust weld. Additionally, a welding process that expends more energy may require larger, heavier, more powerful, and thus more expensive welding equipment. Such increased consumption of welding energy tends to reduce the overall efficiency of the welding operation, and, coupled with the higher cost and size of the welding equipment, tends to increase the effective cost of the finished assembly.

Some welding processes involve melting the base material microstructure at the weld interface, while others are configured as solid-state joining processes. One type of a solid-state joining process is friction-stir welding (FSW). FSW is frequently used for joining aluminum components, because, in comparison with alternative welding processes, FSW inputs smaller amounts of thermal energy and generates less thermal distortion in the components being joined.

SUMMARY

A welded assembly characterized by improved structural integrity includes a first component disposed along a first plane. The first component includes first and second substantially parallel surfaces, and includes a channel arranged on the first surface. The assembly also includes a second component disposed along a second plane, wherein the second component includes a leading edge. The leading edge of the second component is inserted into the channel of the first component such that an interface is formed between the first and second components. A weld applied or generated on the second surface joins the first component with the second component at the interface such that the assembly is formed.

The first plane may be substantially orthogonal to the second plane.

The weld generated on the second surface may be a friction-stir weld. Such a friction-stir weld may penetrate into the channel without emerging on the first surface.

The first component and the second component may each retain a respective material microstructure at the interface following the generation of the weld.

In the first component, an aperture may connect the channel and the second surface. Additionally, the edge of the second component may include a projection configured to engage the aperture.

The first component may be a face plate and the second component may be a crash box, each for a vehicle bumper system. Accordingly, the weld may be used to at least partially join such a vehicle bumper support.

Each of the first and second components may be formed from one of aluminum, magnesium, titanium, copper, and steel.

A method of forming such a welded assembly is also disclosed.

The above features and advantages and other features and advantages of the present invention are readily apparent from the following detailed description of the best modes for carrying out the invention when taken in connection with the accompanying drawings.

DETAILED DESCRIPTION

Figure 1:
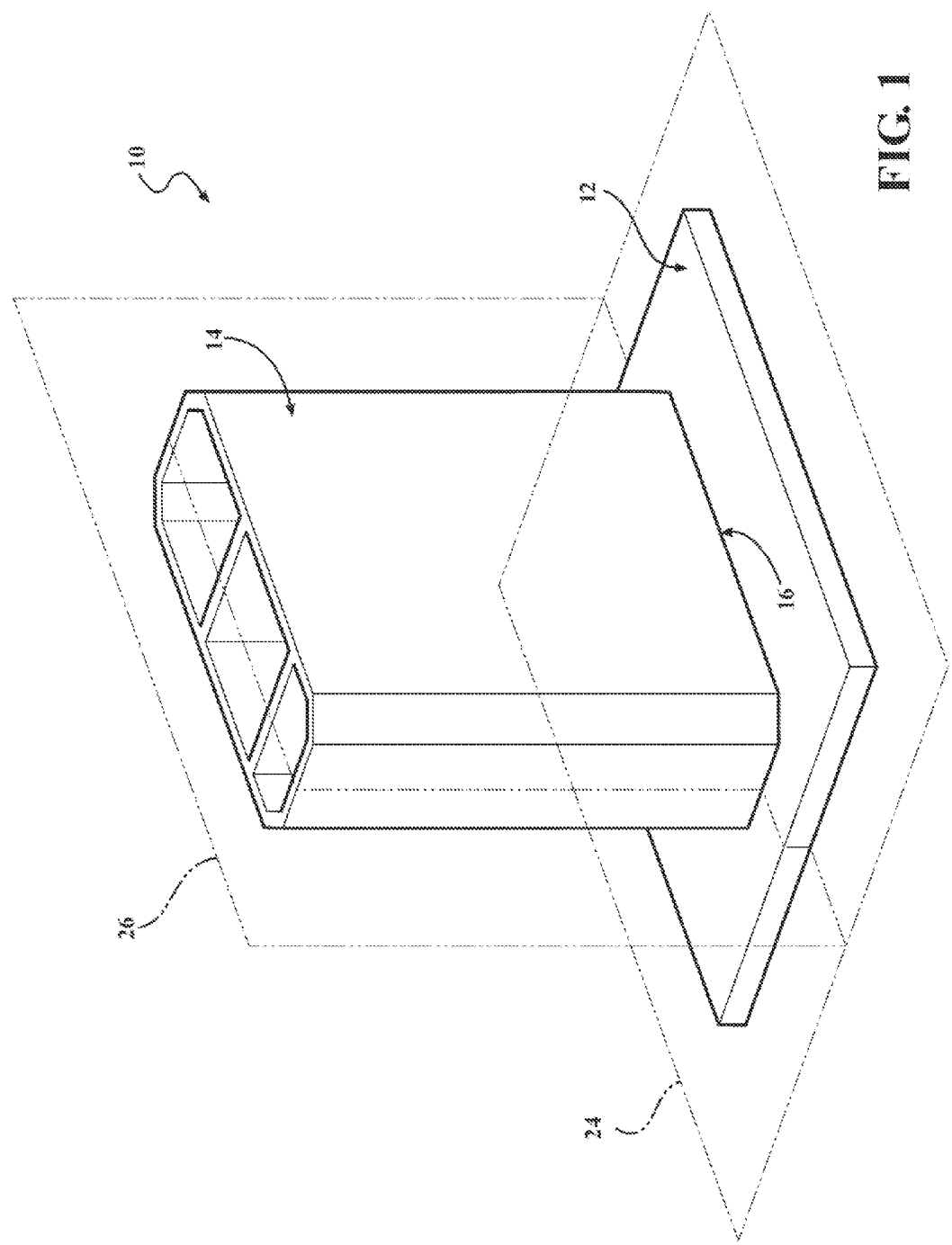
FIG. 1 is a perspective view of a welded assembly that is shown as a segment of a bumper support structure for a vehicle.

Referring to the drawings, wherein like reference numbers refer to like components, FIG. 1 shows a welded assembly 10 characterized by improved structural integrity. The welded assembly 10 is shown as a bumper support structure, as commonly utilized on motor vehicles (not shown). As shown, the welded assembly 10 is configured to absorb a force that the subject vehicle may receive during an impact. The welded assembly 10 includes a first component or a face plate 12 and a second component or a crash box 14 that are joined at an interface 16. Although the description provided herein is for a bumper support assembly, the interface 16 may also be employed in any other assembly where improved structural integrity of a welded joint is desired.

Figure 2:
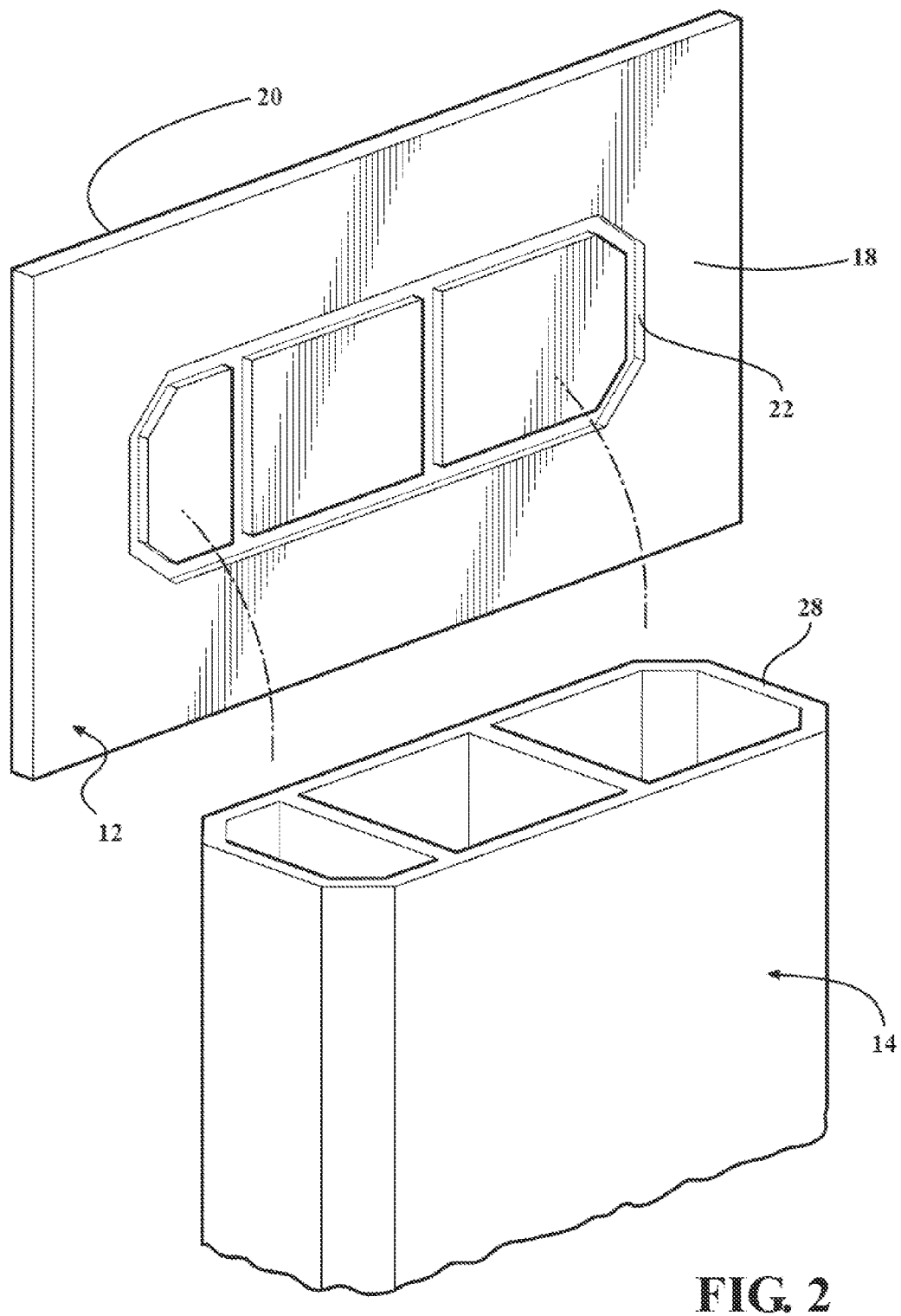
FIG. 2 is a view of components of the assembly shown in FIG. 1, the components being illustrated in a pre-joined state.

FIG. 2 shows the face plate 12 and the crash box 14 in a pre joined state. The crash box 14 of the bumper support welded assembly 10 is a structural member that is generally arranged on the perimeter of the subject vehicle. The face plate 12 includes a first surface 18 and a second surface 20. Accordingly, the surfaces 18, 20 are substantially parallel, opposite faces of the face plate 12. The face plate 12 also includes a channel 22 arranged on the first surface 18. As shown in FIG. 1, in a fully assembled subject vehicle, the face plate 12 is disposed along a first plane 24, while the crash box 14 is disposed along a second plane 26 that is substantially orthogonal to the first plane 24.

Figure 3:
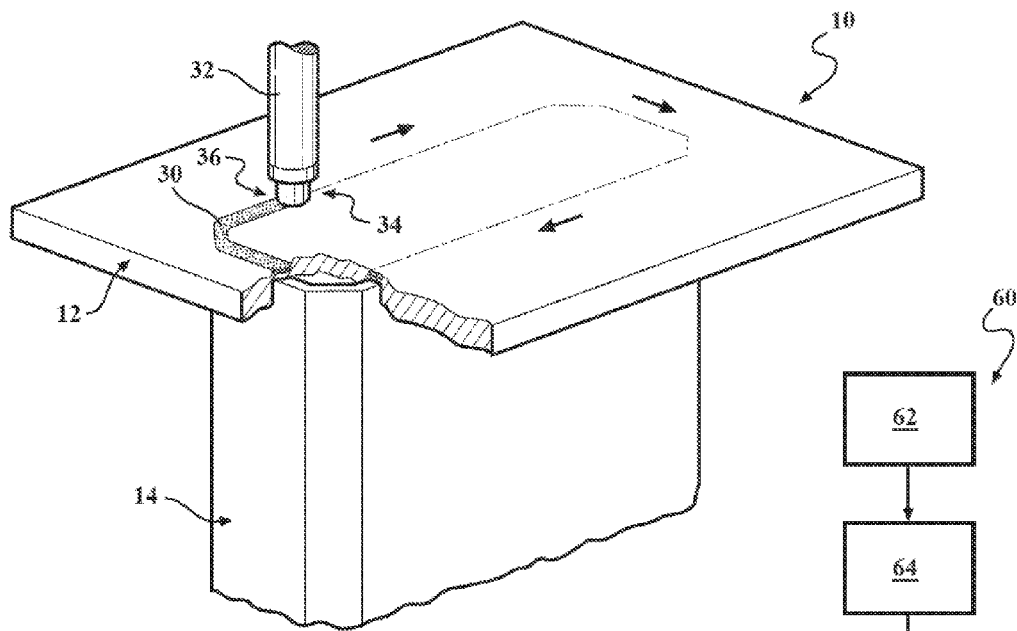
FIG. 3 is a perspective view of the assembly while the components shown in FIGS. 1-2 are being joined by a friction-stir weld.

With renewed reference to FIG. 2, the crash box 14 includes a leading edge 28 that is inserted into the channel 22 when the crash box is assembled with the face plate 12. Accordingly, the insertion of the edge 28 into the channel 22 forms the interface 16 between the face plate 12 and the crash box 14. When the welded assembly 10 is assembled on a vehicle, the face plate 12 and the crash box 14 are attached as a unit to a frame (not shown) of the subject vehicle via any appropriate fastening means, such as a bolt and a nut. Such construction permits the welded face plate 12 and crash box 14 to be conveniently disassembled and replaced if the vehicle was involved in a collision and the vehicle's bumper was damaged but no plastic deformation occurred in the vehicle frame. With reference to FIG. 3, during the formation of the assembly 10, the face plate 12 is joined to the crash box 14 at the interface 16 by a weld 30 generated or applied on the second surface 20. The crash box 14 is designed to collapse in a controlled manner under the force of impact, and thus absorb a substantial part of the force before the impact is transferred to the passenger compartment portion of the vehicle's frame. As depicted in FIG. 3, the weld 30 joining the face plate 12 to the crash box 14 at the interface 16 is generated via a friction-stir welding (FSW) process.

FSW is a solid-state joining process for components that are formed from metal, such as steel, aluminum, magnesium, titanium, and copper. FSW is termed a solid-state welding process because the base metal structure is not melted during joining of the components. Because the base metal structure is not melted during FSW, this process is especially useful for applications where it is desirable for the original metal characteristics to remain unchanged after the assembly is completed. Accordingly, FSW is frequently used to create large assemblies which cannot be easily heat treated to recover material temper characteristics after the weld has been completed.

As shown in FIG. 3, a wear-resistant cylindrical-shouldered tool 32 may be used to generate the friction-stir weld at the interface 16. To generate the welded assembly 10, initially the crash box 14 and the face plate 12 are butted or fitted together. Following the fitting together of the crash box 14 and the face plate 12 at the interface 16 by insertion of the edge 28 into the channel 22, the tool 32 is engaged with the second surface 20 for generating the weld 30 thereon. The tool 32 is then rotated at a generally constant speed and fed at a generally constant traverse rate into the interface 16.

Frictional energy is generated between the tool 32 and the materials of the crash box 14 and the face plate 12. Such frictional energy, along with the energy generated by the mechanical mixing process within the materials of the crash box 14 and the face plate 12 at the interface 16, causes the stirred materials to soften without reaching their respective melting points. In turn, the softening of the stirred materials permits the tool 32 to traverse along the second surface 20 in a plasticized pool of metal while welding the face plate 12 and the crash box 14 at the interface 16.

During the generation of the friction-stir weld 30, the tool 32 is rotated and fed along the second surface 20. As the tool 32 is thus rotated and fed along the second surface 20, a leading face 34 of the tool forces the plasticized material to a back side 36 of the tool, while applying a substantial forging force to consolidate the weld material at the interface 16. Accordingly, the welding of the face plate 12 and the crash box 14 is facilitated by severe plastic deformation of the face plate and the crash box at the interface 16 in the solid state, subsequently culminating in dynamic re-crystallization of the base material. Accordingly, although the weld 30 entails plastic deformation and stirring of the base materials of the face plate 12 and crash box 14, the resultant joint nevertheless retains the respective material microstructures of the face plate and crash box at the interface 16.

As a result of the interface 16 being created by the edge 28 inside the channel 22, the placement of the friction-stirred region generated by the weld 30 may be controlled more reliably with respect to the first surface 18. Correspondingly, the process that generates the weld 30 may be sufficiently robust to consistently penetrate into the channel 22 and join the face plate 12 and the crash box 14, but without the weld 30 sporadically emerging on or accessing the first surface 18. As observed from testing of friction-stir welded assemblies, such sporadic penetration of the first surface 18 by the weld 30 may produce welded assemblies with inconsistent structural integrity. Therefore, the ability to retain the first surface 18 undisturbed by the friction-stirred region provides an improved structural integrity welded assembly 10. For purposes of clarity, FIG. 3 illustrates the weld 30 consolidating the material of the face plate 12 and the crash box 14 in the channel 22, but remaining comfortably away from the first surface 18.

Figure 4:
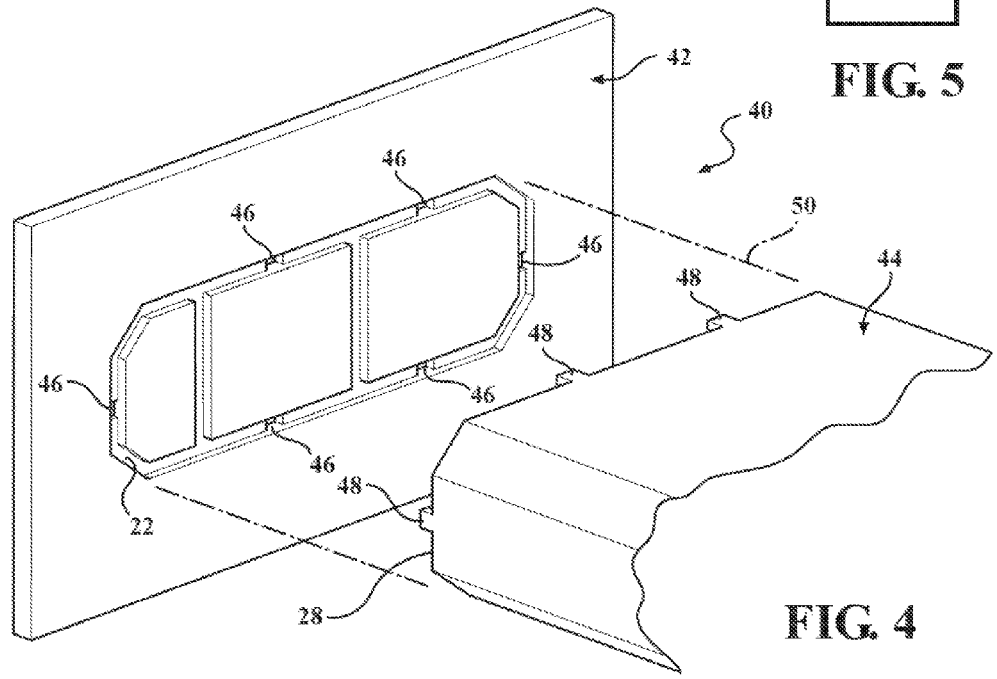
FIG. 4 is a perspective view of an assembly similar to that shown in FIGS. 1-3 but having the components being engaged by an aperture and projection interface, the components being illustrated in a pre-joined state.

FIG. 4 depicts a welded assembly 40 in a pre-joined state. The welded assembly 40 in its completed state is similar to the welded assembly 10 shown in FIGS. 1-3. The welded assembly 40 includes a face plate 42 and a crash box 44 that are similar to the face plate 12 and the crash box 14, respectively, of the welded assembly 10. However, the face plate 42 includes apertures 46 that connect the channel 22 and the second surface 20, while the edge 28 of the crash box 44 includes projections 48. The projections 48 are configured to engage the apertures 46 during assembly of the face plate 42 and the crash box 44 to form an interface 50. The apertures 46 and the projections 48 are employed for more positive interlocking of the face plate 42 and the crash box 44 prior to the generation of the weld 30. Furthermore, the apertures 46 and the projections 48 are positioned along the path of the tool 32 during the generation of the weld 30 at the interface 50, such that the apertures and projections become part of the friction-stirred region.

Figure 5:
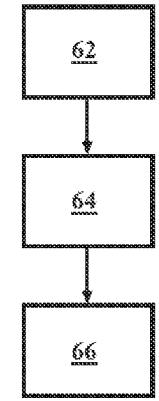
FIG. 5 is a flow chart illustrating a method of forming the welded assembly shown in FIGS. 1-3.

FIG. 5 depicts a method 60 of forming the welded assembly 10. Although the method 60 is described herein with respect to the welded assembly 10 shown in FIGS. 1-3, it is equally applicable to the welded assembly 40 shown in FIG. 4. The method commences in frame 62 with generating the channel 16 on the first surface 18 of the first component, which in the described embodiment is the face plate 12. Such generation of the channel 22 on the first surface may be accomplished by any appropriate metal removal process, such as milling.

After frame 62, the method proceeds to frame 64 with inserting the leading edge 28 of the second component, which in the described embodiment is the crash box 14, into the channel 22, thus forming the interface 16. Accordingly, in frame 64, the face plate 12 and the crash box are abutted for further processing. Following frame 64, the method advances to frame 66, where it includes joining the face plate 12 with the crash box 14 at the interface 16 via the weld 30 generated on the second surface 20 such that the assembly 10 is formed.

As described with respect to FIGS. 1-3, the method may include the weld 30 penetrating into the channel 22 while the friction-stirred region is being generated by the tool 32, but without the weld 30 emerging on the first surface 18. Accordingly, the face plate 12 and the crash box 14 may each retain their respective material microstructure at the interface 16 following the generation of the weld 30.

While the best modes for carrying out the invention have been described in detail, those familiar with the art to which this invention relates will recognize various alternative designs and embodiments for practicing the invention within the scope of the appended claims.

The invention claimed is:

1. A method of forming a friction stir welded assembly, the method comprising:
generating a channel on a first surface of a first component, wherein the first component is disposed along a first plane and includes a second surface that is substantially parallel to the first surface;
forming an aperture on the first component to connect the channel and the second surface;

forming a projection on a leading edge of a second component;

engaging the projection with the aperture;

inserting the leading edge of the second component into the channel such that an interface is formed between the first and second components; and joining the first component with the second component at the interface via a friction stir weld generated on the second surface such that the assembly is formed.

2. The method of claim 1, wherein the second component is disposed along a second plane that is substantially orthogonal to the first plane.

3. The method of claim 1, further comprising penetrating into the channel by the friction-stir weld, but without the weld emerging on the first surface.

4. The method of claim 3, wherein the first component and the second component each retain a respective material microstructure at the interface following the generation of the weld.

5. The method of claim 1, wherein the first component is a face plate and the second component is a crash box, each for a vehicle bumper support system.

6. The method of claim 1, wherein each of the first and second components is formed from one of aluminum, magnesium, titanium, copper, and steel.

* * * * *